Figure 1:
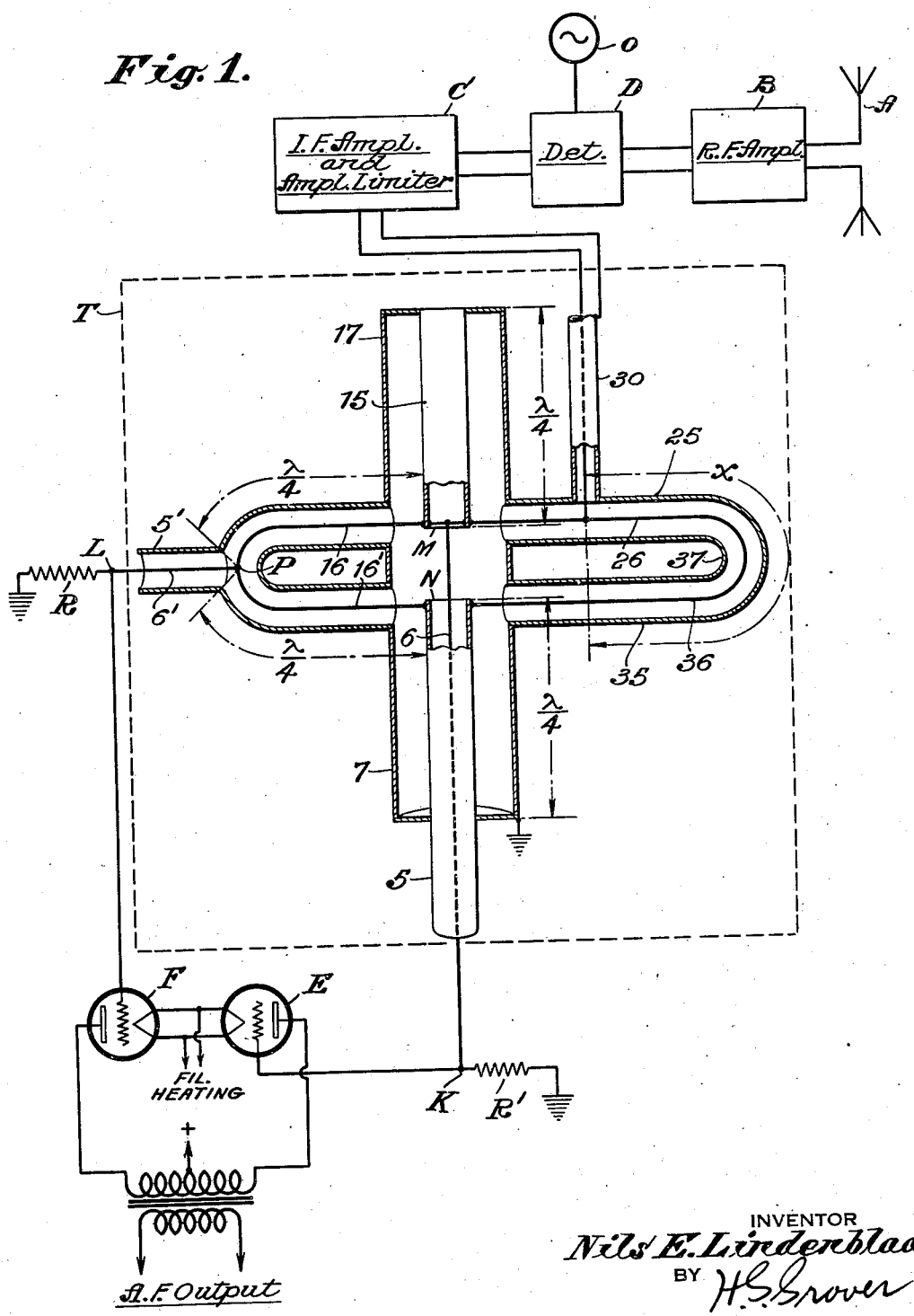

June 18, 1946.  N. E. LINDENBLAD  2,402,421
FREQUENCY CHANGE DETECTOR SYSTEM
Filed July 12, 1941   3 Sheets-Sheet 1

INVENTOR
Nils E. Lindenblad
BY H. S. Grover
ATTORNEY

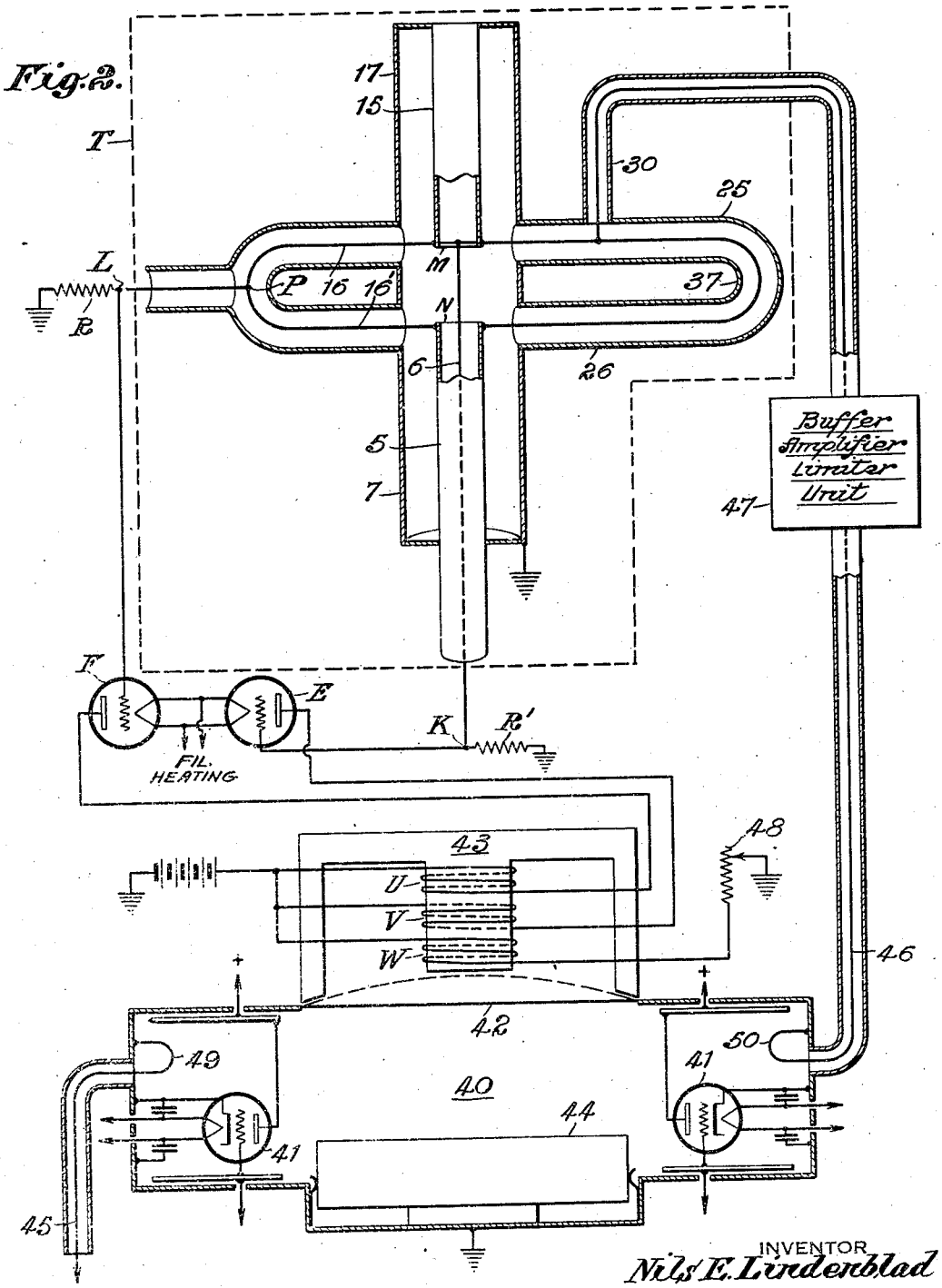

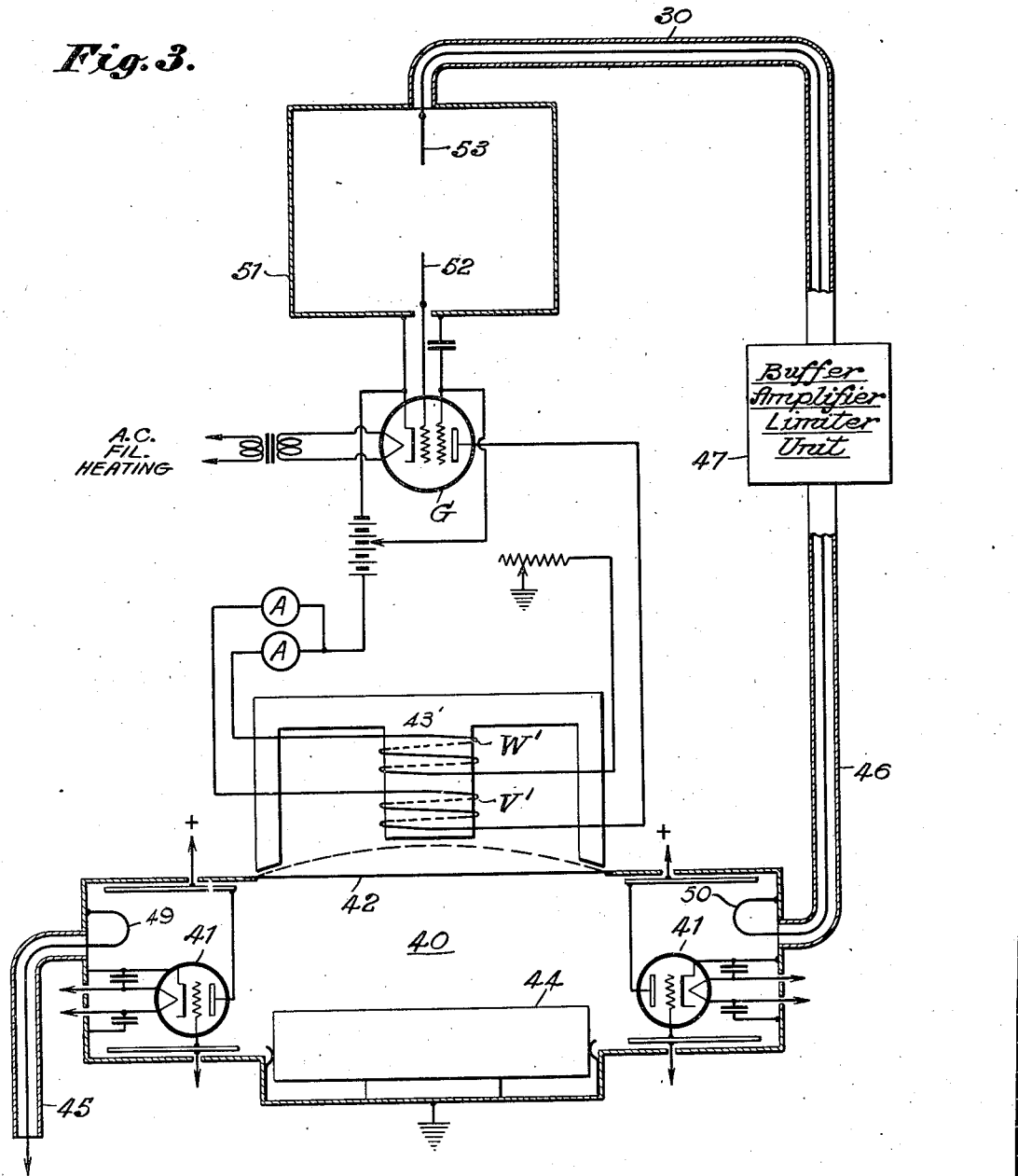

Patented June 18, 1946

2,402,421

UNITED STATES PATENT OFFICE 2,402,421

FREQUENCY CHANGE DETECTOR SYSTEM

Nils E. Lindenblad, Port Jefferson, N. Y., assignor to Radio Corporation of America, a corporation of Delaware Application July 12, 1941, Serial No. 402,082

13 Claims. (Cl. 250—27)

The present invention relates to improvements in frequency change detecting circuits, and particularly to frequency modulation detecting circuits for converting frequency variations into amplitude variations, as well as to automatic frequency control systems.

An object is to provide simple alternative forms of circuit arrangements which may be used for frequency modulation detecting circuits or in automatic frequency control circuits.

Another object of the present invention is to provide a frequency modulation detecting circuit which possesses only one degree of freedom in any particular frequency region.

A further object is to provide a frequency modulation detecting circuit which eliminates the necessity of using tuned circuits in the form of lumped coils and condensers.

A still further object is to provide a frequency modulation detecting circuit employing a coaxial transformer arrangement which functions with high efficiency over a wide frequency band.

Other objects and the features of the present invention will appear from a reading of the following description which is accompanied by drawings wherein Fig. 1 illustrates one embodiment of the present invention used as a frequency modulation detector in a frequency modulation receiving system. Figs. 2 and 3 illustrate other embodiments of the invention employed in automatic frequency control circuits.

In the drawings, the same parts are represented by the same reference numerals throughout the figures.

Fig. 1 shows a frequency modulation receiver system employing the principles of the present invention in order to convert the frequency variations of a received signal into amplitude variations which reproduce the signal modulations. In this figure there is shown an energy collector in the form of an antenna A for receiving the frequency modulated waves. The received waves are amplified by radio frequency amplifier B and then impressed upon a detector D where they are beat with the oscillations of a local oscillator O to produce an intermediate frequency wave which is then amplified, filtered and limited in apparatus C before being impressed upon concentric transmission line 30 for coupling by means of my special push-push, push-pull transformer T, shown in dotted lines, to vacuum tube rectifiers E, F. In effect, the coupling transformer T and vacuum tubes E and F form together a converter or detector for converting the high frequency modulated waves impressed on line 30 to amplitude variations of an audio frequency character reproducing the original signal modulation components. A general description of an arrangement similar to transformer T is given in my copending application Serial No. 339,468, filed June 8, 1940, to which reference is herein made.

The coupling circuit T comprises, in effect, two quarter wave concentric lines 5, 7 and 15, 17, to the free ends M and N of which there is coupled on one side a push-push circuit 16, 16' and on the other side a push-pull circuit 25, 35, 37. At the neutral point P of the push-push circuit there are connected a resistor R which matches the impedance of the legs 16, 16' and also the grid of vacuum tube F. Because the two legs 16, 16' are in parallel and have the same dimensions, it will be apparent that the resistor R has half the impedance value of the individual lines 16, 16'. To the point K of the line 5 there are connected a resistor R' which matches the impedance of line 5, and also the grid of vacuum tube E. The impedance of line 5 is equal to twice the impedance of each of the lines 25 and 35 connected to M and N. In effect, the coaxial line transformer T is designed to have the impedances of the various elements matched throughout the system.

Turning now to the consideration of the push-push push-pull coupling circuit T in more detail, there is shown a single-ended concentric cable or transmission line composed of an outer sheath 5 and an inner conductor 6, the latter being connected to the grid of a vacuum tube E. I have also shown a pair of lines constituting an intermediate coupling circuit and adapted to be coupled in a push-pull relationship, so to speak, with the grid of vacuum tube E, one of said lines being composed of an outer sheath 25 and an inner conductor 26 and the other being composed of an outer sheath 35 and an inner conductor 36. The outer sheaths 5, 25 and 35 may be grounded if desired. The inner conductor 26 is directly connected to inner conductor 6 by way of conductor 15 and is therefore adapted to have currents therein of the same phase relation as the currents on inner conductor 6. The other inner conductor 36 is directly connected to the end N of the sheath 5 of the single-sided line and is therefore adapted to have currents therein which are in phase opposition to the currents on inner conductor 26. I have provided an outer shell 7 surrounding the end of sheath 5 and which has a length equal to a quarter of the mean operating wavelength and is connected to sheath 5 of the single transmission line at its end nearest tube E.

The length of the conducting path of the outer surface of sheath 5 is of such length that the point of connection of 36 thereto is at the free end N of sheath 5 which is electrically freed from the outer conductor of the transmission line 5, 6 as far as radio frequency potentials are concerned. This effect is due to the fact that the length of the conducting path including the outer surface of sheath 5 is substantially equal to a quarter wavelength at the operating frequency and, therefore, presents a distinctly high impedance thereto at the point of connection of conductor 36. Furthermore, no radiation can take place from the current flowing along the outer surface of sheath 5 since any current flowing along the inside of the outer shell 7 is equal and of opposite direction to that on the outer surface of 5. Thus, it will be seen that at the frequency for which the junction is designed, the balanced line composed of lines 25, 35 will not be subjected to any unbalancing effects from the connection to the single line 5, 6. This condition is, however, true only when the surrounding section 7 approximates a quarter of the length of the operating wave. If the frequency is changed or if the operating frequency is widely modulated, some current will leak over the edge of the single transmission line 5, 6. In order to overcome this effect and maintain perfect balance between lines 5, 6 and lines 25, 35 over a wide frequency band, I employ a second quarter wave shell section 17 arranged in an end-on relationship with the outer shell 7. Within the second shell section 17 is an inner conductor 15 having the same diameter as the outer diameter of sheath 5 of the single transmission line. Though I have referred to shells 7 and 17 separately for convenience in description, it should be understood that in practice it may be found more convenient to form them in one continuous piece. The inner conductor 15 is connected at its inner end to the center conductor 6 of the single line and, also, to the center conductor 26 of one of the balanced lines. The other end of 15 is electrically connected to the end of shell 17. The points of connection, and the dimensions of the parts are so chosen, that the junction is perfectly symmetrical with respect to a center plane perpendicular to the axis of shells 7, 17. Ordinarily, shell 17 has the same diameter as shell 7, and conductor 15 has the same diameter as sheath 5. With this construction it will be seen that looking from the push-pull line 25, 35 toward the junction along either conductor 26 or conductor 36, an exactly similar set of conditions is encountered. Therefore, for a wide frequency band or for frequencies varying widely from the frequency for which the junction is designed, the reactive drain on conductor 36 due to an improper length of shell 7 is duplicated by an equal drain on conductor 26 by shell portion 17.

From the foregoing description it will be seen that conductors 25, 35 are in push-pull relationship relative to single-sided line 5.

A pair of conductors 16, 16', each equal to a quarter of the mean operating wavelength of the system, is connected to the adjacent ends of shell 5 and conductor 15. These conductors are connected to the central conductor of a single-sided transmission line 5', 6' and thence to vacuum tube F. It will be seen that there is, in effect, a half wave loop connected across the adjacent ends of conductors 26 and 36 and formed by conductors 16, 16'. Such a half wave loop will, of course, not adversely affect the operation of the circuit as far as vacuum tube E is concerned. The coupling between the grid of vacuum tube F and conductors 26 and 36 occurs through exactly equivalent lengths of line 16, 16' and the resultant energy is therefore in an in-phase or "push-push" relationship.

The loop 37 connecting lines 25 and 35 is designed to have such length that the connections from elements 5 and 15 to the inner conductor of the single transmission line 30 have a differential length X which at the intermediate mean frequency of the receiver A is half way between an even and an odd multiple of a half wavelength. This differential length X is sufficiently great versus the wavelength that the relative phase between the branch terminations represented here by junction points L and K will vary greatly with frequency. In effect, the differential length X has such a length at the intermediate mean assigned frequency that there is an equal push-push component applied to branch termination L and an equal push-pull component applied to branch termination K.

When the mean frequency or carrier frequency applied to line 30 by the receiver is at its normal or assigned value, it will be apparent from what has been said above that equal values of current will be applied to the grids of the vacuum tube rectifiers E and F, in which case both tubes will draw an equal amount of current and there will be no current in the audio frequency output circuit labeled "A. F. Output." When, however, the mean frequency or carrier frequency departs from its assigned value to one side such that the length X of the transformer T is now an even multiple of a half wavelength, then there will be no phase difference between the open ends M and N of the two concentric lines 5, 7 and 15, 17, and consequently no current will flow in the inner conductor 6 of the concentric line 5, 7. In this case, however, although no current flows to termination K and the grid of vacuum tube E, there will be current flowing to the termination L and the grid of vacuum tube F, since the currents in the two lines 16, 16' are in cophasal relation to the common junction point P. Thus, in this condition vacuum tube F will draw current and vacuum tube E will draw no current. When, however, the mean frequency or carrier frequency departs from its assigned value on the other side, such that the length X is an odd multiple including unity of a half wavelength, then there will be a phase difference of 180° between the open ends M and N and energy will flow out through conductor 6 to termination K and the grid of vacuum tube E, but no current will flow to termination L and the grid of vacuum tube F. This will be evident from the fact that termination L is effectively at a neutral point. In this last condition, tube E will draw current and tube F will draw no current. The output curves from points L and K under each of these two conditions have the desirable simplicity of circuits having only one degree of freedom. At intermediate values of the mean frequency, that is, between the extreme values at which only one of the two vacuum tubes draws current to the exclusion of the other, the two vacuum tubes will draw unequal amounts of current, depending upon the degree of the frequency variation applied to the transmission line 30, and a varying rectified audio frequency output will be obtained from the vacuum tubes E and F and reproduce the signal modulation. It will thus be seen that I have been able to convert the frequency variation of the frequency modulated wave applied to transmission line 30 from the receiver to amplitude variations of an audio frequency character in the output of the vacuum tubes E and F. By making the distance X sufficiently long versus the wave length, the relative phases between the branch terminations K and L will vary greatly with frequency.

Fig. 2 shows a further development of the present invention as applied to a system for maintaining constant the frequency of an oscillator. In Fig. 2 there is shown a resonant cavity oscillator 40 having therein a multiplicity of driver vacuum tubes 41 symmetrically arranged around its interior. The grids of the vacuum tubes are connected by radio frequency blocking condensers to one side of the cavity resonator, while the anodes of the tubes are connected by radio frequency blocking condensers to the other side of the cavity resonator. Between both sides of the resonator there is a potential difference of relatively opposite phase in reference to the cathode which is connected to some point in the resonator which is intermediate both said sides. The upper wall of the resonant cavity oscillator 40 is provided with a movable magnetic diaphragm 42 for changing the dimensions of the resonant cavity oscillator under control of a solenoid 43. A suitable movable metallic plunger 44 in the interior of the resonant cavity oscillator is employed to provide an initial adjustment of the cavity resonator to give the desired frequency of oscillations. Plunger 44 is directly connected at its periphery to the cavity resonator by means of spring contacts. In order to maintain constant the frequency of oscillations derived from the resonant cavity oscillator by way of output leads 45, there is provided a circuit 46 which abstracts a portion of the energy in the cavity oscillator and applies the same to a buffer amplifier and amplitude limiter unit 47 and then to the line 30 in the same manner as the frequency modulated waves are applied to line 30 in Fig. 1. Solenoid 43 is composed of three coils U, V and W. Coils U and V are oppositely wound relative to one another and coupled respectively with the anode circuits of vacuum tube rectifiers F and E in the manner shown. Coil W is a magnetic bias coil whose bias value can be controlled by potentiometer 48. The magnetic fields produced by winding V and U are added to or subtracted from the magnetic field produced by the bias winding W in such manner as to control the movement of the magnetic diaphragm in accordance with the differential currents in the rectifiers E and F.

Lines 45 and 46 are shown coupled to the interior of the resonant cavity by means of loops 49 and 50, respectively, although it will be obvious that, if desired, these loops may be replaced by suitable probes extending in the interior of the cavity 40. The push-push, push-pull transformer T functions in the same manner as the similarly labeled circuit T of Fig. 1.

Normally, the system is so adjusted that when the cavity oscillator generates oscillations of the assigned frequency, both tubes F and E draw equal currents and diaphragm 42 is in a position pulled up half way between extreme positions. However, when the frequency of the oscillator varies from its normal assigned frequency due to temperature variations or for other reasons, then the rectifiers E and F will draw unequal amounts of current and will cause the solenoid 43 to influence the magnetic diaphragm in such sense either up or down, so as to change the dimensions of the cavity in the direction necessary to restore the frequency of the oscillator to the assigned value.

An advantage of the use of my push-push, push-pull transformer T for the purposes set forth above in Figs. 1 and 2 is that changes in the condition of loading do not affect the frequency at which the transformer functions. The only variations that can take place are those caused by dimensional changes due to temperature or mechanical changes, and these can be overcome by using temperature control and vibrational prevention measures.

Fig. 3 illustrates another way of maintaining constant the frequency of a resonant cavity oscillator. In Fig. 3, the pair of vacuum tubes of Fig. 2 have been replaced by a single vacuum tube G and the transformer T of Fig. 2 has been replaced by a high Q-low loss output tank circuit 51, also of the cavity type. The solenoid 43' of Fig. 3 is composed of a bias coil W' and another coil V', the latter being in series with the anode circuit of the vacuum tube G. The magnetic field produced by the winding V' will add to or subtract from the magnetic field produced by the winding W', in accordance with the variations of current in the output of the vacuum tube G. The control grid of tube G is coupled by means of a probe 52 to the input of the tank circuit 51. The energy derived from the resonant cavity by way of line 46 is applied to the cavity resonator through unit 47, line 30 and probe 53. The probes 53 and 52 are suitably located in the interior of the tank 51 in order respectively to excite the tank and to apply the energy to the vacuum tube G. The resonant frequency of the tank 51 is designed to be somewhat different from the resonant frequency of the energy applied thereto by means of which the operation of the circuit occurs on the linear portion of the resonance characteristic of the tank 51. In this way, any variation of the frequency derived from the resonant cavity oscillator 40 from the assigned value and applied to the tank 51 will either increase or decrease the amount of output obtained from the tank 51 and applied to the control grid of the vacuum tube G, thus causing the solenoid 43' to move the magnetic diaphragm 42 of the oscillator 40 in such direction as to change the dimensions of the resonant cavity with a consequent change in the frequency of the resonant cavity 40 in the proper sense to restore the oscillation frequency to the assigned value.

It should be understood that the invention is not limited to the precise arrangements of parts shown in the drawings, since various modifications may be made without departing from the spirit and scope of the invention. As an example, the rectifiers E and F of Figs. 1 and 2 can be replaced by diodes or other equivalent circuit schemes. Further, the use of radio frequency amplifier B and detector D in Fig. 1 are not in any way compulsory or dictated by the transforming ssytem of the invention, and are only required by certain considerations in some particular forms of frequency modulation systems.

What is claimed is:

1. A frequency change detector system comprising a pair of vacuum tube rectifiers, each having a grid and an anode, an output circuit connected between said anodes, a transformer arrangement including a pair of quarter wave length concentric lines each short circuited at one end, a first conducting loop connected at its ends substantially to the other ends of said concentric lines, a connection from one of said last ends of one of said concentric lines extending through the entire length of the interior of the inner conductor of the other concentric line to the grid of one of said vacuum tube rectifiers, a second conducting loop connected at its ends substantially to the same points on said concentric lines to which the first loop is connected, a feeder line carrying the waves to be detected connected to a junction point on said second loop unsymmetrically with respect to its center point, the difference in length along said second loop as measured from said junction point to those points on the concentric lines to which said second loop is connected being half way between an odd multiple and an even multiple of a half wavelength for the mean frequency of the waves carried by said feeder, said first loop being a half wavelength long for said mean frequency, a connection from the midpoint of said first loop to the grid of the other of said vacuum tube rectifiers, whereby departures of frequency of the waves on said feeder from said mean frequency causes said rectifiers to pass unequal amounts of current.

2. A frequency change detector system comprising a pair of vacuum tube rectifiers, each having a grid and an anode, an output circuit connected between said anodes, a transformer arrangement including a pair of quarter wavelength concentric lines each short circuited at one end, a first loop connected at its ends substantially to the other ends of said lines, a connection from one of said last ends of one of said lines extending through the entire length of the interior of the inner conductor of the other concentric line to the grid of one of said vacuum tube rectifiers, a resistor having a value which matches the impedance of said last concentric line also connected to the grid of said one rectifier, a second loop connected at its ends substantially to the same points on said lines to which the first loop is connected, a feeder line carrying the waves to be detected connected to a junction point on said second loop unsymmetrically with respect to its center point, the difference in length along said second loop as measured from said junction point to those points on the coaxial lines to which said second loop is connected being half way between an odd multiple and an even multiple of a half wavelength for the mean frequency of the waves carried by said feeder, said first loop being an odd multiple including unity of a half wavelength long for said mean frequency, a connection from the midpoint of said first loop to the grid of the other of said vacuum tube rectifiers, whereby departures of frequency of the waves on said feeder from said mean frequency causes said rectifiers to pass unequal amounts of current, and a resistor having a value matching the impedance of the legs of said first loop connected to the midpoint of said first loop.

3. A frequency modulation detector system comprising a pair of vacuum tube rectifiers, each having a grid and an anode, an output circuit connected between said anodes, a transformer arrangement including a pair of quarter wavelength concentric lines each short circuited at one end, a first loop connected at its ends substantially to the other ends of said lines, a connection from one of said last ends of one of said lines extending through the entire length of the interior of the inner conductor of the other concentric line to the grid of one of said vacuum tube rectifiers, a second loop connected at its ends substantially to the same points on said lines to which the first loop is connected, a feeder line coupled to a receiver and carrying the waves to be detected connected to a junction point on said second loop unsymmetrically with respect to its center point, the difference in length along said second loop as measured from said junction point to those points on the concentric lines to which said second loop is connected being half way between an odd multiple and an even multiple of a half wavelength for the mean frequency of the waves carried by said feeder, said first loop being a half wavelength long for said mean frequency, a connection from the midpoint of said first loop to the grid of the other of said vacuum tube rectifiers, whereby departure of frequency of the waves on said feeder from said mean frequency causes said rectifiers to pass unequal amounts of current, and an audio frequency utilization circuit coupled to said output circuit.

4. An automatic frequency control circuit comprising a pair of vacuum tube rectifiers, each having a grid and an anode, an output circuit connected between said anodes, a transformer arrangement including a pair of quarter wavelength concentric lines each short circuited at one end, a first conducting loop connected at its ends substantially to the other ends of said concentric lines, a connection from one of said last ends of one of said concentric lines extending through the entire length of the interior of the inner conductor of the other concentric line to the grid of one of said vacuum tube rectifiers, a second conducting loop connected at its ends substantially to the same points on said concentric lines to which the first loop is connected, a feeder line coupled to the source whose frequency is to be controlled and carrying the waves to be detected connected to a junction point on said second loop unsymmetrically with respect to its center point, the difference in length along said second loop as measured from said junction point to those points on the concentric lines to which said second loop is connected being half way between an odd multiple and an even multiple of a half wavelength for the assigned frequency of the waves carried by said feeder, said first loop being a half wavelength long for said assigned frequency, a connection from the midpoint of said first loop to the grid of the other of said vacuum tube rectifiers, whereby departures of frequency of the waves on said feeder from said assigned frequency causes said rectifiers to pass unequal amounts of current, and means coupling said output circuit to said source for controlling the same to maintain a constant frequency.

5. An automatic frequency control circuit comprising a pair of vacuum tube rectifiers, each having a grid and an anode, an output circuit connected between said anodes, a transformer arrangement including a pair of quarter wavelength concentric lines each short circuited at one end, a first conducting loop connected at its ends substantially to the other ends of said concentric lines, a connection from one of said last ends of one of said concentric lines extending through the entire length of the interior of the other concentric line to the grid of one of said vacuum tube rectifiers, a second conducting loop connected at its ends substantially to the same points on said concentric lines to which the first loop is connected, a feeder line coupled to the source whose frequency is to be controlled and carrying the waves to be detected connected to a junction point on said second loop unsymmetrically with respect to its center point, the difference in length along said second loop as measured from said junction point to those points on the concentric lines to which said second loop is connected being half way between an odd multiple and an even multiple of a half wavelength for the assigned frequency of the waves carried by said feeder, said first loop being a half wavelength long for said assigned frequency, a connection from the midpoint of said first loop to the grid of the other of said vacuum tube rectifiers, whereby departures of frequency of the waves on said feeder from said assigned frequency causes said rectifiers to pass unequal amounts of current, said source including a resonant tank, said feeder line being coupled to said tank, a tuning element for said tank, and means coupling said output circuit to said tuning element for adjusting the same to maintain a constant frequency from said source.

6. An automatic frequency control circuit comprising a pair of vacuum tube rectifiers, each having a grid and an anode, an output circuit connected between said anodes, a transformer arrangement including a pair of quarter wavelength concentric lines each short circuited at one end, a first conducting loop connected at its ends substantially to the other ends of said concentric lines, a connection from one of said last ends of one of said concentric lines extending through the entire length of the interior of the inner conductor of the other concentric line to the grid of one of said vacuum tube rectifiers, a second conducting loop connected at its ends substantially to the same points on said concentric lines to which the first loop is connected, a feeder line coupled to the source whose frequency is to be controlled and carrying the waves to be detected connected to a junction point on said second loop unsymmetrically with respect to its center point, the difference in length along said second loop as measured from said junction point to those points on the concentric lines to which said second loop is connected being half way between an odd multiple and an even multiple of a half wavelength for the assigned frequency of the waves carried by said feeder, said first loop being a half wavelength long for said assigned frequency, a connection from the midpoint of said first loop to the grid of the other of said vacuum tube rectifiers, whereby departures of frequency of the waves on said feeder from said assigned frequency causes said rectifiers to pass unequal amounts of current, said source including a resonant tank having a flexible wall for changing the dimensions thereof, and means coupled to said output circuit and responsive to a change in current therein for flexing said wall in such direction and to such an extent as to restore said tank to its assigned frequency of operation.

7. A system in accordance with claim 6, characterized in this that said means coupled to said output circuit for flexing the wall of said tank comprises a solenoid having a bias winding and a pair of other windings, said pair of windings being oppositely wound relative to each other.

8. A frequency change detector system comprising a pair of detectors, each having an input electrode and an output electrode, a transformer arrangement including a pair of quarter wavelength concentric lines each short circuited at one end, a first conducting loop connected at its ends substantially to the other ends of said concentric lines, a connection from one of said last ends of one of said concentric lines extending through the entire length of the interior of the inner conductor of the other concentric line to the input electrode of one of said detectors, a second conducting loop connected at its ends substantially to the same points on said concentric lines to which the first loop is connected, a feeder line carrying the waves to be detected connected to a junction point on said second loop unsymmetrically with respect to its center point, a connection from the midpoint of said first loop to the input electrode of the other detector, the difference in length along said second loop as measured from said junction point to those points on the concentric lines to which said second loop is connected being such that at a predetermined frequency both detectors have the same amount of energy impressed upon their input electrodes but with departure of the frequency from said predetermined value the detectors carry unequal amounts of energy, and an output circuit coupled to the output electrodes of said detectors.

9. An automatic frequency control system comprising an electron discharge device oscillator whose frequency is to be controlled, a resonant chamber coupled to said oscillator for stabilizing the frequency of oscillations, said chamber having a flexible magnetic diaphragm in one wall thereof for enabling the dimensions of said chamber to be changed, a solenoid located adjacent said diaphragm for controlling the position of said diaphragm, a feeder line coupled to said resonant chamber for abstracting energy therefrom, and means coupled to said feeder line and also to said solenoid and responsive to a change of frequency from the assigned frequency of said oscillator for causing said solenoid to change the position of said diaphragm in such sense and degree as to restore the frequency of oscillations to the assigned frequency.

10. A system in accordance with claim 9, characterized in this that said solenoid includes a biasing coil and at least one other coil coupled to said means.

11. A system in accordance with claim 9, characterized in this that said solenoid includes a biasing coil and at least one other coil coupled to said means, and said means includes another resonant chamber to which said feeder line is coupled for exciting the same.

12. A frequency change detector system comprising a pair of detectors, each having a pair of electrodes, a transformer arrangement including a pair of quarter wave-length concentric lines each short circuited at one end, a first conducting loop connected at its ends substantially to the other ends of said concentric lines, a connection from one of said last ends of one of said concentric lines extending through the entire length of the interior of the inner conductor of the other concentric line to one electrode of one of said detectors, a second conducting loop connected at its ends substantially to the same points on said concentric lines to which the first loop is connected, a feeder line carrying the waves to be detected connected to a junction point on said second loop unsymmetrically with respect to its center point, a connection from the midpoint of said first loop to an electrode of the other detector corresponding to said one electrode of the first mentioned detector, the difference in length along said second loop as measured from said junction point to those points on the concentric lines to which said second loop is connected being such that at a predetermined frequency both detectors have the same amount of energy impressed upon their above-mentioned corresponding electrodes but with departure of the frequency from said predetermined value the detectors carry unequal amounts of energy, and an output circuit coupled to the other electrodes of said detectors.

13. An automatic frequency control system comprising a resonant chamber circuit having a flexible magnetic diaphragm in one wall thereof for enabling the dimensions of said chamber to be changed, a solenoid located adjacent said diaphragm for controlling the position of said diaphragm, a feeder coupled to said resonant chamber for abstracting energy therefrom, and means including an electron discharge device coupled to said feeder and also to said solenoid and responsive to a change of frequency from the assigned frequency of said resonant chamber circuit for causing said solenoid to change the position of said diaphragm in such sense and degree as to restore the frequency of the chamber circuit to the assigned frequency.

NILS E. LINDENBLAD.